United States Patent [19]
Jenkins et al.

[11] 3,881,816
[45] May 6, 1975

[54] SLIDE PROJECTOR KEYING DEVICE

[75] Inventors: Andrew H. Jenkins; Robert L. Morgan; Raymond P. Bennett; Charles E. Dugas, all of Huntsville, Ala.

[73] Assignee: The United States of America as represented by the Secretary of the Army, Washington, D.C.

[22] Filed: Jan. 21, 1974

[21] Appl. No.: 435,346

[52] U.S. Cl. .............................................. 353/122
[51] Int. Cl. .......................................... G03b 21/00
[58] Field of Search ............. 353/19, 116, 117, 103, 353/122, 120; 40/152, 158 B, 156

[56] References Cited
UNITED STATES PATENTS

| | | | |
|---|---|---|---|
| 3,469,513 | 9/1969 | Hansen | 353/116 |
| 3,480,356 | 11/1969 | Dimitracopoulos | 353/19 |
| 3,644,032 | 2/1972 | Dimitracopoulos | 353/19 |

*Primary Examiner*—Richard E. Aegerter
*Assistant Examiner*—A. J. Mirabito
*Attorney, Agent, or Firm*—Robert P. Gibson; Nathan Edelberg; Herbert H. Murray

[57] ABSTRACT

A device to be inserted in a slide slot in a projector. The device having an end turned up at a substantially 45° angle so that slides having a corner keyed by clipping the corner on a line 45° from the bottom will only fit into the slide slot in one position.

1 Claim, 1 Drawing Figure

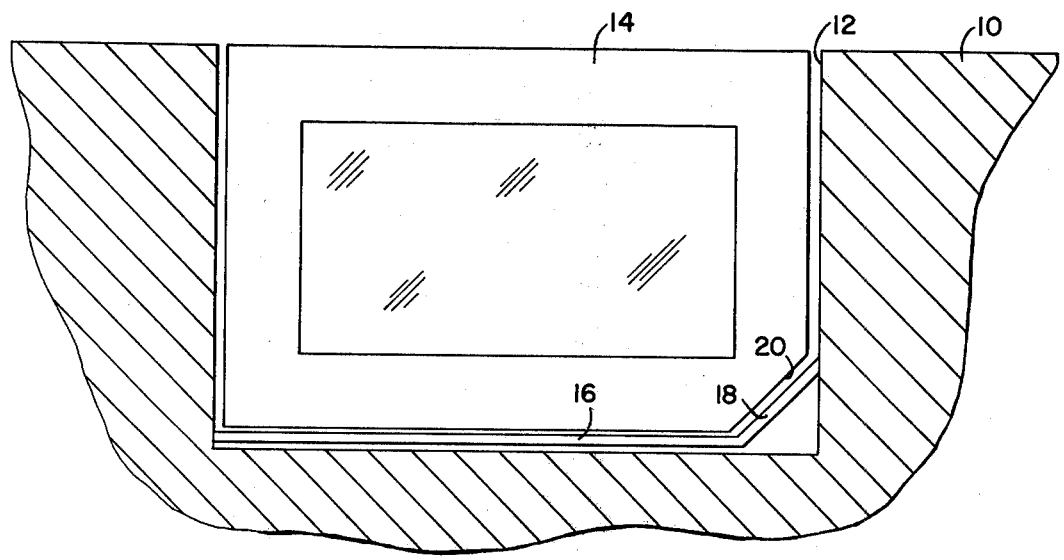

SLIDE PROJECTOR KEYING DEVICE

BACKGROUND OF THE INVENTION

Slide projectors presently available do not have any keying means for properly orienting the slides being projected. The subject matter of a slide is often projected upside down, backwards, etc. on the screen several times before it is projected properly.

It is therefore an object of this invention to provide a keying device for insertion into the slide slot of a projector which will permit only properly oriented slides to be inserted.

BRIEF DESCRIPTION OF THE DRAWING

The single FIGURE of the drawing illustrates the keying device of the present invention in place in the slide slot of a projector.

DETAILED DESCRIPTION OF THE INVENTION

Referring now to the drawing, 10 represents a slide projector having a slot 12 into which the slides 14 to be projected are inserted. The device 16 of the present invention is installed in the bottom of the slot 12. The device 16 is a metal strip slightly less in width than the width of the slot 12. One end 18 of the strip 16 is bent upwardly at an angle of substantially 45°. The slide 14 is keyed by having one corner clipped at a 45° angle as shown at 20. Thus the slide can only be inserted when the clipped or keyed corner matches the upturned end 18 of the strip 16.

The strip 16 may be permanently affixed within the slot 12 or it may be removable so that it can be placed in any projector available to cooperate with a set of keyed slides. Thus a lecturer can carry his keyed slides and a keying strip with him and by inserting the keying strip into a projector insure that the slides he projects will all be properly oriented.

We claim:

1. In combination with a slide projector having a slide slot into which slides to be projected are inserted the improvement which comprises, a metal strip adapted to be placed in the bottom of said slot, one end of said metal strip being turned up at an angle to the remainder of said strip whereby only slides having a corner clipped and properly oriented can be fully inserted into said slide slot.

* * * * *